United States Patent [19]

Piani et al.

[11] Patent Number: 5,430,133
[45] Date of Patent: * Jul. 4, 1995

[54] SEMI-SYNTHETIC GLYCOSAMINOGLYCANS WITH HEPARIN OR HEPARAN STRUCTURE OF α-L-IDURONIC-2-O-SULFATE ACID MODIFIED IN POSITION 2

[75] Inventors: Silvano Piani, Bologna; Egidio Marchi; Gianfranco Tamagnone, both of Casalecchio di Reno; Fabrizio Ungarelli, Bologna, all of Italy

[73] Assignee: Alfa Wassermann S.p.A., Alanno, Italy

[ * ] Notice: The portion of the term of this patent subsequent to May 16, 2002 has been disclaimed.

[21] Appl. No.: 46,248

[22] Filed: Apr. 13, 1993

[30] Foreign Application Priority Data

Apr. 17, 1992 [IT] Italy ................. B092A0141

[51] Int. Cl.6 .................. C08B 37/10; A61K 31/725
[52] U.S. Cl. ........................ 536/21; 536/124; 514/8; 514/56; 530/322; 530/345
[58] Field of Search ............... 514/56, 8; 536/124, 536/21; 530/322, 345

[56] References Cited

U.S. PATENT DOCUMENTS

| | | | |
|---|---|---|---|
| 4,987,223 | 1/1991 | Choay et al. | 536/17.7 |
| 5,010,063 | 4/1991 | Piani et al. | 514/56 |
| 5,104,860 | 4/1992 | Piani et al. | 514/56 |
| 5,200,523 | 4/1993 | Fleet | 546/220 |

FOREIGN PATENT DOCUMENTS 0347588 5/1989 European Pat. Off. .
0380943 8/1990 European Pat. Off. .

OTHER PUBLICATIONS

*The Merck Index*, Merck and Co., Inc. 1989, Eleventh Edition, monograph No. 4571, p. 4575.
Carey, F. A.; Sundberg, R. J. "Advanced Organic Chemistry—Part B: Reactions and Synthesis" 2nd ed. Plenum Press, New York 1983, pp. 498–501.
Morrison, R. T.; Boyd, R. N. "Organic Chemistry" 4th ed. Allyn and Bacon, Boston 1983, pp. 549–550.
Jaseja et al. Can. J. Chem. 1989, 67, 1449–1456.

*Primary Examiner*—Douglas W. Robinson
*Assistant Examiner*—Kathleen Kahler Fonda
*Attorney, Agent, or Firm*—Bucknam and Archer

[57] ABSTRACT

New heparin and heparan sulfate derivatives having antithrombotic activity, also endowed with reduced haemorrhagic and anticoagulant activity, are obtained by nucleophilic addition to heparin and heparan sulfate derivatives containing 2,3-anhydrogulonic acid residues. The compounds have the formula IV

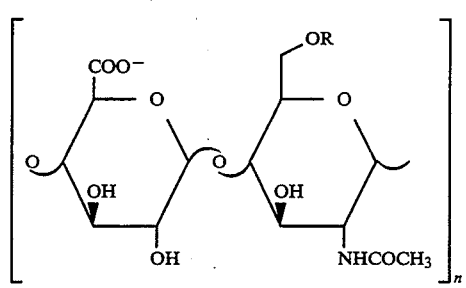

The glycosaminoglycan derivatives obtained through this treatment show a structural modification in the unit of α-L-iduronic acid 2-O-sulfate with the partial or total selective substitution of the O-sulfate group in position 2 with a nucleophilic residue. The structural modifications produce an improvement of the biological properties of the heparin and heparan sulfate, substantially keeping the antithrombotic activity while diminishing the haemorragic effect in vivo and the anticoagulant activity in vitro.

27 Claims, No Drawings

SEMI-SYNTHETIC GLYCOSAMINOGLYCANS WITH HEPARIN OR HEPARAN STRUCTURE OF α-L-IDURONIC-2-O-SULFATE ACID MODIFIED IN POSITION 2

BACKGROUND OF THE INVENTION

In the published European patent application EP 0347588 a description was given of a structural modification, in basic medium, of gycosaminoglycans with heparin and heparan structure with subsequent isolation from the reaction mixture of new derivatives with respect to the state of the art, as demonstrated unmistakably by the chemical and physical characteristics and especially by the $^{13}$C-NMR spectrum.

In the subsequent published European patent application EP 0380943 a further structural modification was described, in a basic or neutral medium, which, starting from the products formed in the reaction conditions described in EP 0347588, and from the glycosaminoglycans with heparin or heparan structure used as starting products in EP 0347588, originated a range of new products, different from those described in EP 0347588 and new with respect to the state of the art, as demonstrated unmistakably by the chemical and physical characteristics and especially by the $^{13}$C-NMR spectrum.

The chemical and physical characteristics of the products described in EP 0347588 and the results of a subsequent structural study described by Jaseia H., Rej R., Sauriol F., Perlin A. S. in Can. J. Chem 67, 1449–56 (1989), with the specific object of explaining the mechanism of the reaction of structural modification in a basic medium, have demonstrated that these derivatives show a modification which involves just one of the saccharide units characteristic of glycosaminoglycans with heparin or heparan structure, more specifically the unit of α-L-iduronic acid sulfated in position 2 and involving its transformation into a 2,3-epoxygulonic unit.

Likewise it has been demonstrated that semi-synthetic glycosaminoglycans with one 2,3-epoxygulonic unit and also glycosaminoglycans with heparin or heparan structure, under conditions of reaction similar to those described in EP 0380943, undergo a structural modification which also involves the saccharide unit of α-L-iduronic acid sulfated in position 2 and involving the transformation of this saccharide unit into a unit of non-sulfated α-L-iduronic acid or α-L-galacturonic acid, according to the conditions of reaction used.

So EP 0347588 describes semi-synthetic glycosaminoglycans containing an epoxy function between positions 2 and 3 of the unit of α-L-iduronic-2-O-sulfate acid taken as a starting point and the conditions of reaction necessary for obtaining them, while EP 0380943 describes products deriving from further transformation of the epoxide, confirmed as having one unit of non-sulfated α-L-iduronic or α-L-galacturonic acid, and the conditions of reaction necessary for obtaining them starting from the epoxide itself or, as an alternative, starting from the glycosaminoglycans with heparin or heparan structure themselves, used as starting products in EP 0347588.

SUMMARY OF THE INVENTION

One object of the present invention is to provide new semi-synthetic glycosaminoglycans with heparin or heparan structure characterized by the fact that they contain the unit of α-L-iduronic acid substituted in position 2 by a nucleophilic residue.

The new derivatives in the present patent application represent a further development as regards the state of the art, and in particular, as regards the above-mentioned published European patent applications. Indeed, in the latter patents, products were claimed which were obtained in basic aqueous medium, using water as nucleophile. In the present patent application the new products are obtained through reaction with a series of carefully selected nucleophilic reagents and under such conditions as to obtain the introduction of the corresponding nucleophilic residue in position 2 of the uronic unit.

Another object of the invention consists of the process for obtaining the above-mentioned products starting from a suitable nucleophile and from the epoxides described in EP 0347588.

To better define the field of the present invention, it should be stressed that the expression glycosaminoglycans with heparin or heparan structure is intended to indicate polysaccharides with a molecular weight of between about 3000 and about 50000 Daltons and characterized by the fact of possessing a disaccharide unit consisting of a uronic acid (which may be α-L-iduronic or β-D-glucuronic) and of α-D-glucosamine, connected, in alternate sequences, by 1,4-glycosidic bonds as described by Lindhal U., Kjellen L. in Thrombosis and Haemostasis 66, 44–48 (1991) and by Turnbull J. E., Gallagher J. T. in Biochem. J. 273, 553–559 (1991). Since the α-L-iduronic acid can be sulfated in position 2 and the glucosamine can be N- acetylated, N-sulfated, 6-O-sulfated, 3-O-sulfated, according to the variable positions of the substituents, at least 10 different disaccharide units are possible, whose combination may generate a large number of different sequences. Bearing in mind the most represented disaccharide units and the most frequent sequences, we can say with reasonable approximation, that the general formula I can be attributed to glycosaminoglycans with heparin or heparan structure

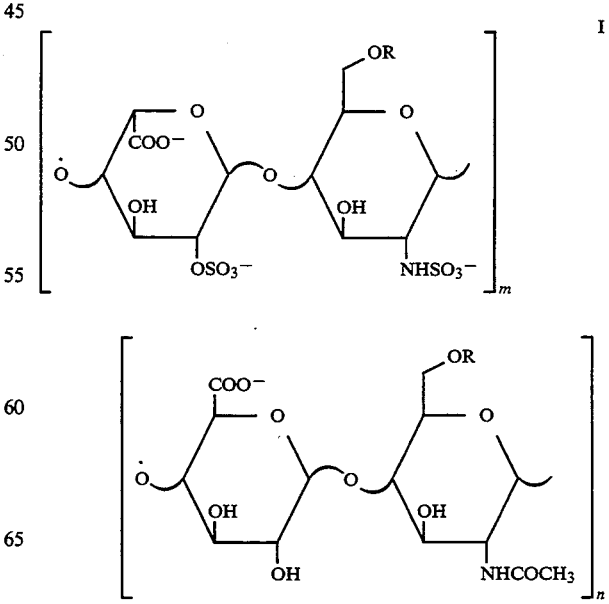

where R represents hydrogen or the sulfate residue (SO$_3^-$) and where m and n are whole numbers between 1 and 100.

In heparin structured glycosaminoglycans of natural origin the value of m is high and the disaccharide unit A represents about 80% of the disaccharide units; on the contrary, in heparan structured glycosaminoglycans of natural origin the value of n is high and the disaccharide unit B represents about 80% of the disaccharide units.

The general formula I and the subsequent general formulae III and IV are intended to reveal the composition of the main saccharide units but make no reference to their sequence.

As is known to people in this field, it is possible to make a chemical modification of glycosaminoglycans of natural origin, for example through reactions of N-desulfatation, possibly followed by reactions of N-acetylation, thus also obtaining semi-synthetic N-desulfated heparins or N-desulfated-N-acetylated heparins. In addition, these glycosaminoglycans, whether natural or semi-synthetic, may be subjected to depolymerization processes by means of which the molecular weight is taken to levels generally between 3000 and 10000 Daltons.

The structural modification described in this invention for obtaining new semi-synthetic glycosaminoglycans with heparin or heparan structure refers to the unit of α-L-iduronic-2-O-sulfate acid where the partial or total selective substitution of the 0-sulfate group in position 2 with a nucleophilic residue, whatever it might be the desired compound with heparin or heparan structure, takes place. Indeed, besides being selective, the chemical process described in this invention can be applied to glycosaminoglycans with heparin or heparan structure which present all the possible sequences; ie. it is independent of the type and of the level of functionalization of the saccharide unit which precedes or follows in the sequence the unit of α-L-iduronic-2-O-sulfate acid which is the object of the reaction of structural modification.

The structure of the new products is represented by the general formula IV

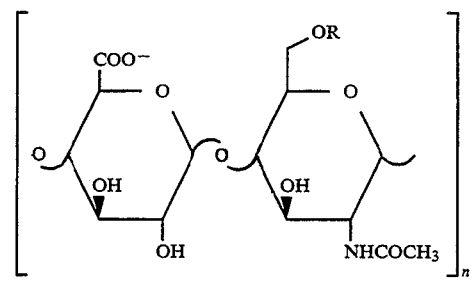

where p+q=m, with p other than 0, and m, n and R have the meaning as shown above, and where —Z(R$_2$)R$_1$ represents the nucleophilic group introduced through the process described in this invention. The compounds obtained in this way will be indicated as "semi-synthetic glycosaminoglycans with heparin or heparan structure of general formula IV in which —Z(R$_2$)R$_1$ is the nucleophilic group".

The reaction of structural modification which involves the partial or total introduction of the nucleophilic group in position 2 of the α-L-iduronic acid does not lead to the depolymerization of the glycosaminoglycans or alteration in the distribution of the molecular weight of the polysaccharide chains which form them, and for this reason the present reaction can be applied to glycosaminoglycans with heparin or heparan structure of any molecular weight. The products obtained can however be subjected to the known processes of chemical or enzymatic depolymerization.

DETAILED DESCRIPTION OF THE INVENTION

The subject of the present invention concerns new semi-synthetic glycosaminoglycans with heparin or heparan structure in which the original structure of general formula I

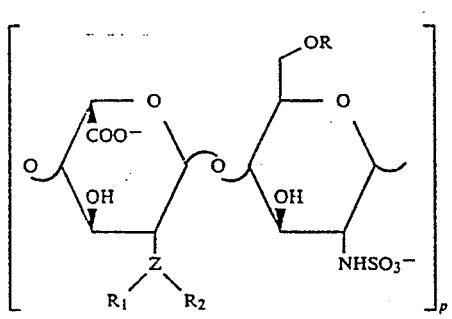

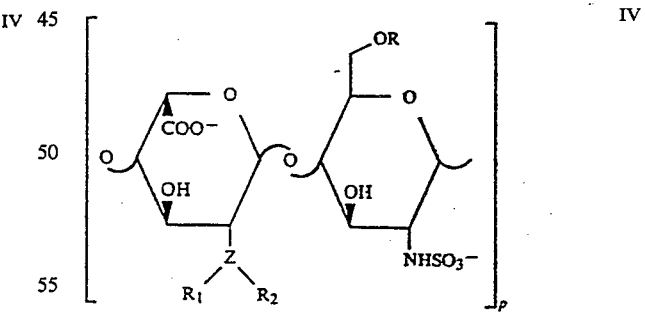

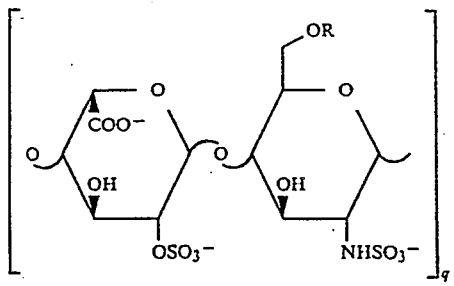

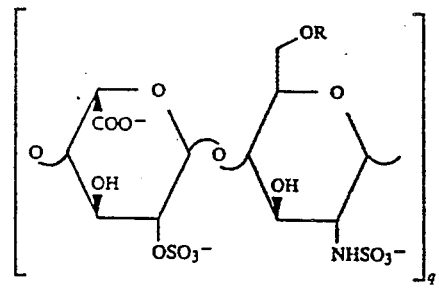

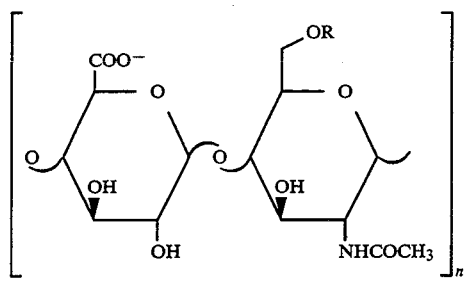

in which R represents hydrogen or the sulfate residue ($SO_3^-$) and m and n are whole numbers with values between 1 and 100, has undergone a structural modification in position 2 of the α-L-iduronic-2-O-sulfate acid with partial or total transformation of -O-sulfate radical to a nucleophilic radical of general formula II

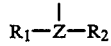
II with formation of semi-synthetic glycosaminoglycans with heparin or heparan structure of general formula IV

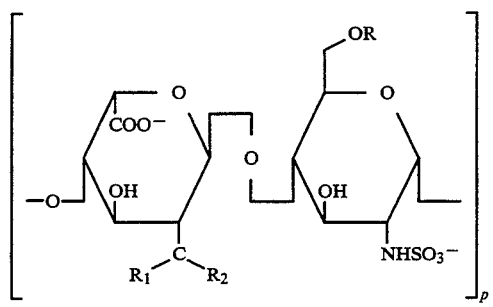
IV

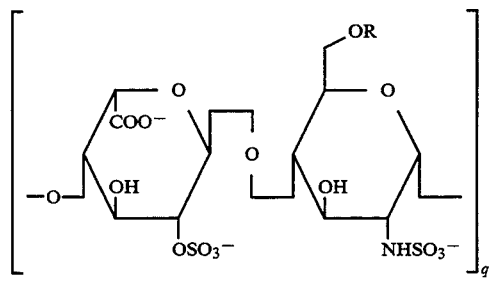

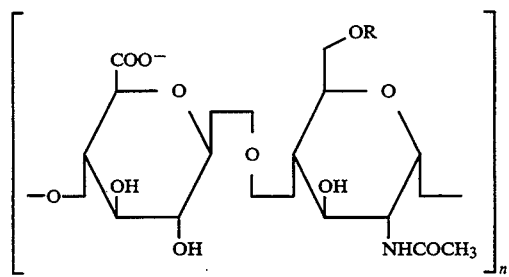

where p+q=m, with p other than 0, and m, n and R have the meaning defined above. All the nucleophilic reagents may be used to advantage in carrying out this invention and in fact the group —$Z(R_2)R_1$ is included in a nucleophilic reagent.

More specifically, Z represents oxygen, sulphur or nitrogen, $R_1$ is straight ($C_{1-12}$) or branched ($C_{3-12}$) alkyl, amino, aryl, diazo or hydroxy groups substituted or not substituted and $R_2$ represents zero when Z is oxygen or sulphur or hydrogen or a straight ($C_{1-6}$) or branched ($C_{3-6}$) alkyl group or taken with $R_1$ forms a heterocyclic ring when Z is nitrogen. The substituents of the group $R_1$ are selected from the halogen, amino, aryl, carboxy, guanidino, nitro, hydroxy, sulfonic, sulfuric, mercapto or ureido groups which may or may not be substituted.

The groups deriving from primary or secondary amines, secondary heterocyclical amines, aminoalcohols, aminothiols, amino acids, aminoesters, peptides, alcohols, phenols, mercaptans, dithiols, thiophenols, hydroxylamines, hydrazines, hydrazides and sodium azide are preferred in carrying out the present invention.

Particularly preferable in carrying out the present invention are the groups —$Z(R_2)R_1$ originating from the following nucleophilic reagents: glycine, glycylglycine, L-cysteine, acetyl-L-cysteine, L-cysteine ethyl ester, 2-aminothiophenol, 1,3-propanedithiol, cysteamine, sodium azide, 2-aminoethyl hydrogen sulfate, taurine, thioglycolic acid, β-alanine ethyl ester, L-cystine, hydroxylamine, glycyltaurine, cysteinyltaurine, glycylcysteine, glycylphenylalanine, glycyltyrosine, 2-aminoethanol, glycine 2-aminoethyl ester, glycine 2-hydroxy-ethyl amide, arginyllysine, arginine, lysine, acetic acid 2-aminoethyl ester, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

Another object of the present invention is the process used for synthesizing semi-synthetic glycosaminoglycans with heparin or heparan structure of general formula IV starting from semi-synthetic glycosaminoglycans with 2,3 epoxygulonic structure of general formula III

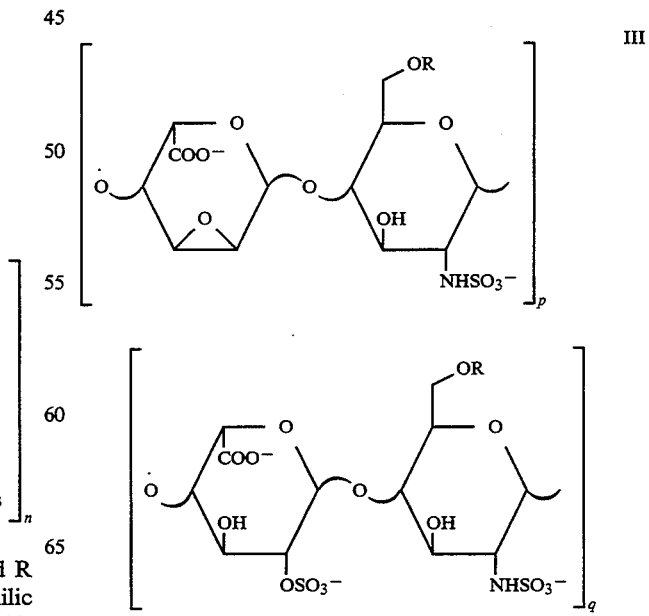
III

-continued

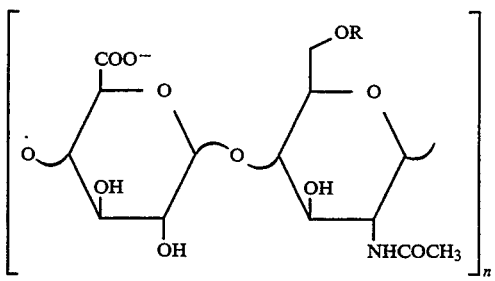

where p, q, n and R have the meaning indicated above, obtained according to the process described in the published European patent application EP 0347588.

The process for obtaining semi-synthetic glycosaminoglycans with heparin or heparan structure of general formula IV involves reacting a semi-synthetic glycosaminoglycan with 2,3 epoxygulonic structure of general formula III with a nucleophilic reagent which includes the group II, in the presence of a solvent and a quantity of inorganic or organic base able to salify any acid groups present in the nucleophilic reagents and/or to free the same nucleophilic reagents from any salts they may have with substances of an acidic nature. Using any base may be obviously unnecessary where the nucleophilic reagent contains no groups of an acidic nature and/or is not salified with a substance of an acid nature. The reaction is carried out by dissolving the semi-synthetic glycosaminoglycan with 2,3-epoxygulonic structure of formula III in a solvent and by adding a solution containing the nucleophilic reagent and any inorganic or organic base. The solvent may be dimethylacetamide, dimethylformamide, acetonitrile, dioxane, tetrahydrofuran, or mixtures thereof with water or water.

The reaction mixture is kept under stirring, possibly in an atmosphere of inert gas, preferably nitrogen, when the nucleophilic reagent is easily oxidizable, at a temperature of between 0° C. and 70° C., preferably between 10° C. and 30° C., for a period of time of between 2 and 120 hours, preferably between 24 and 96 hours.

At the end of the reaction, the reaction mixture is diluted with water when the solvent used is not water, then the pH of the aqueous solution is adjusted a neutral pH by adding an aqueous solution of hydrochloric acid. The excess of nucleophilic reagent may optionally be removed, for example by extraction with a solvent which is not miscible with water, with chloroform or diethyl ether, or by filtration when it is not soluble in aqueous medium with neutral pH. The clear aqueous solution may be further purified at a later stage by dialysis, cut off 3000 Daltons, first in running water and then in distilled water. Finally the semi-synthetic glycosaminoglycan with heparin or heparan structure of general formula IV is isolated through lyophilization of the aqueous solution which contains it or by precipitation on addition of a suitable solvent.

The quantity of nucleophilic agent used is between 1 and 200 molar equivalents with respect to the dimer unit of the glycosaminoglycan of general formula III containing the epoxy group, from 10 to 100 equivalents are preferably used. The solvent is selected from among water and polar solvents such as dimethylacetamide, dimethylformamide, acetonitrile, dioxane, tetrahydrofuran or their mixtures with water. The inorganic bases preferred are alkaline or alkaline-earth hydroxides, preferably sodium or potassium hydroxide, while the preferred organic bases are tertiary amines such as triethylamine.

In a preferred aspect of the invention, the reaction is carried out by dissolving in water the semi-synthetic glycosaminoglycan with heparin or heparan structure of general formula III and by adding, under stirring, an aqueous solution containing from 10 to 100 molar equivalents of nucleophilic reagent with respect to the dimer unit of the glycosaminoglycan of general formula III containing the epoxy group and a quantity of sodium hydroxide sufficient to salify any acid groups present in the nucleophilic reagent and/or to release the same nucleophitic reagent from a possible salt with substances of an acid nature. The reaction mixture, in which the concentration of semi-synthetic glycosaminoglycan is preferably between 1% and 5%, is kept, under stirring, optionally in an atmosphere of inert gas, at room temperature for a period between 24 and 96 hours. At the end of the reaction the pH of the mixture is neutralized with aqueous hydrochloric acid, the excess of the nucleophilic reagent can be removed by means of passive extraction with a solvent not miscible with water or by filtration and then the reaction solution may be subjected to dialysis, cut off 3000 Daltons, first with running water and then with distilled water for a period of between 6 and 24 hours. The solution is finally subjected to lyophilization or a suitable solvent is added to It to obtain the semi-synthetic glycosaminoglycan with heparin or heparan structure of general formula IV.

A feature of the semi-synthetic glycosaminoglycans obtained in this way is that they lack 2-O-sulfate group of α-L-iduronic acid that has been substituted by heteroatoms, nitrogen, sulphur or oxygen, being part of the nucleophilic reagents such as amines, aminoacids, aminoesters, peptides, alcohols, mercaptans, phenols, thiophenols. In this way a co-valent bond is introduced between the molecule of the glycosaminoglycans with heparin or heparan structure and a nucleophilic residue which, by modifying the structural properties of the above-mentioned glycosaminoglycans, improves the possibility of their being absorbed orally and retains their characteristic anti-thrombotic properties with the advantage of showing a significant reduction in the bleeding time and the anti-coagulant activity. In relation to the corresponding natural glycosaminoglycans with heparin or heparan structure, the semi-synthetic glycosaminoglycans with heparin or heparan structure described in the present invention thus have the advantage of an anti-thrombotic and thrombolytic activity which is basically equivalent, accompanied by a lower risk of hemorrhage, as is clearly demonstrated by the pharmacological bleeding tests carried out in vivo on animals, and of being absorbed orally.

The biological activity of the new semi-synthetic glycosaminoglycans, the subject of the present invention, was defined through some typical heparin tests; more specifically tests relative to the APTT Activated Partial Thromboplastin Time, to the time of bleeding and the anti-thrombotic activity were performed.

The APTT activity was defined according to the method of Larrieu M. J. and Weiland G. in Rev. Hematol., 12, 199, (1957).

Each product in examination was dissolved in plasma collected from fasting rats, then scalar dilutions were performed to obtain the concentrations required by the method. 10 determinations were performed for each product and the activity of each product was expressed in terms of concentration, in mcg/ml, which doubles the time of APTT. This means that the plasmatic concentration of the product expressed in mcg/ml is measured, which doubles the coagulation time measured on the plasma of a rat and expressed as APTT.

The values obtained confirm that the new semi-synthetic glycosaminoglycans show a decrease in anticoagulant power with respect to a standard heparin.

The bleeding time was determined in the rat according to the method described by Dejana E. et al in Thromb. Haemost., 48, 108, (1982). The test is carried out by using non-anesthetized rats of about 300 g weight, administering the compound being investigated, and after 10 minutes, cutting 2 cm of the tail and measuring the bleeding time with a cronometer. The result was expressed by calculating the percentage of the time of extension of the bleeding In rats treated with the new semi-synthetic glycosaminoglycans with respect to the control rats.

The new semi-synthetic glycosaminoglycans showed a reduction in the bleeding time with respect to a standard heparin. Anti-thrombotic activity was determined in the rat by means of the stasis venous thrombosis test described by Reyers S. et al in Thromb. Res., 18, 669–674, (1980). To assess the capacity to prevent the formation of thrombus, the products were injected intravenously into the femoral vein 10 minutes before ligature of the inferior vena cava. After 2 hours the thrombi were removed, dried and weighed.

Anti-thrombotic activity was expressed both as percentage incidence (percentage of rats presenting the thrombus) and as reduction in weight of the thrombus with respect to the control thrombus.

In both cases the results were expressed as $ED_{50}$ in mg/kg.

The results obtained demonstrated that the anti-thrombotic activity of the new semi-synthetic glycosaminoglycans is similar to that of a standard heparin.

Determination of the free amino groups was performed by means of u.v./visible spectrophotometry at 358 nm on the product obtained through reaction with trinitrobenzensulfonic acid (TNBS), according to the method described by Satake K. et al in J. Biochem., 47, 654, (1960), while determination of the sulphur was performed by means of potentiometry. The specific rotatory power was measured in aqueous solution in a 1% concentration.

The $^{13}$C-NMR spectra were performed at 50.3 MHz with a Varian Gemini 200 spectrometer using the sodium salt of 3-(trimethylsilyl) propionic acid deuterated (D$_4$) in the positions 2,2 and 3,3 as internal reference standard.

The standard heparin taken as reference to evaluate the biological activity of the new glycosaminoglycans described in the present invention shows the following values of pharmacological activity according to the tests described above:
  APTT (2T)=2.5 mcg/ml
  Bleeding time: 111% at 0.5 mg/kg
  Anti-thrombotic activity ($ED_{50}$):
    Weight loss=0.20 mg/kg
    Incidence %=0.40 mg/kg
The chemical and physical data relative to standard heparin, taken as reference, and determined with the above-mentioned methods are:
  Free amino groups=0.3%
  S=10.9%
  $^{13}$C-NMR (p.p.m.): 177.5; 105.1; 102.1; 99.5; 80.1; 78.7; 73.9; 72.4; 72.0; 69.2; 62.6; 60.8; 56.7; 24.8.
  $[a]_{546}^{20} = +60°$
  $[a]_{589}^{20} = +49°$ The examples below must be taken as an illustration of the present invention and not as a limitation of it.

EXAMPLE 1

Semi-Synthetic Glycosaminoglycan with Heparin or Heparan Structure of General Formula IV in Which —Z(R$_2$)R$_1$ Corresponds to Glycyl A solution containing 3760 mg of glycine and 2000 mg of sodium hydroxide in 22,5 ml of water is added, at room temperature, to a solution containing in 2,5 ml of water 500 mg of semi-synthetic glycosaminoglycan with 2,3 epoxygulonic structure described in example 3 of EP 0347588.

The reaction mixture is kept under stirring at room temperature for 48 hours, then pH is neutralized through the addition of hydrochloric acid and the solution is then subjected to dialysis, cut off 3000 Daltons, for 12 hours in running water and for 6 hours in distilled water and is finally lyophilized. 520 Mg of product of the title are obtained with the following analytical and pharmacological characteristics:
  Free amino groups=1.35%
  $^{13}$C-NMR (p.p.m.): 178.1; 104.8; 102.0; 98.7; 80.3; 79.2; 77.3; 71.8; 69.2; 62.9; 60.8; 53.6.
  $[a]_{546}^{20} = +48°$
  $[a]_{589}^{20} = +39°$
  APTT (2T)=18.0 mcg/ml
  Anti-thrombotic activity ($ED_{50}$):
  Weight loss=0.23 mg/kg
  Incidence %=0.75 mg/kg

EXAMPLE 2

Semi-Synthetic Gycosaminoglycan with Heparin or Heparan Structure of General Formula IV in which —Z(R$_2$)R$_1$ Corresponds to Glycylglycyl The reaction is performed in the same conditions as described in Example 1 using 6600 mg of glycylglycine instead of 3760 mg of glycine and extending the reaction time to 96 hours.

630 Mg of product of the title are obtained with the following analytical characteristics:
  Free amino groups=4.9%
  $^{13}$C-NMR (p.p.m.): 180.0; 178.6; 176.6; 104.8; 103.4; 98.7; 80,0; 79.2; 77.0; 72.4; 71.8; 69.8; 69.2; 62.9; 61.0; 53.1; 46.2; 43.9.
  $[a]_{546}^{20} = +56°$
  $[a]_{589}^{20} = +46°$

EXAMPLE 3

Semi-Synthetic Glycosaminoglycan with Heparin or Heparan Structure of General Formula IV in which —Z(R$_2$)R$_1$ Corresponds to (S)-L-Cysteinyl The reaction is carried out under the same conditions as described in Example 1 using 8780 mg of L-cysteine monohydrate hydrochloride instead of 3760 mg of glycine and 4000 mg of sodium hydroxide instead of 2000 mg.

570 Mg of product of the title are obtained with the following analytical and pharmacological characteristics:
  Free amino groups=10.4%

$^{13}$C-NMR (p.p.m.): 177.0; 175.2; 104.2; 97.2; 78.1; 77.5; 72.2; 71.2; 69.0; 62.2; 60.3; 56.1; 50.1; 36.5.
$[a]_{546}^{20} = +30°$
$[a]_{589}^{20} = +30°$
APTT (2T) = 16.6 mcg/ml
Anti-thrombotic activity (ED$_{50}$):
Weight loss = 0,40 mg/kg
Incidence % = 0.72 mg/kg
Bleeding time:
63% at 0.5 mg/kg
114% at 1 mg/kg

EXAMPLE 4

Semi-Synthetic Glycosaminoglycan with Heparin or Heparan Structure of General Formula IV in which —Z(R$_2$)R$_1$ Corresponds to (S)-L-Cysteinyl Ethyl-Ester The reaction is carried out under the same conditions as described in Example 1 using 9280 mg of L-cysteine ethylester hydrochloride instead of 3760 mg of glycine, 550 Mg of product of the title are obtained with the following analytical and pharmacological characteristics:

Free amino groups = 11,4%
$^{13}$C-NMR (p.p.m.): 177.8; 175.4; 104.5; 98.4; 78.6; 77.8; 72.6; 71.8; 69.1; 66.5; 60.3; 56.2; 55.9; 50.2; 36.9; 15.9.
$[a]_{546}^{20} = +49°$
$[a]_{589}^{20} = +43°$
APTT (2T) = 10,3 mcg/ml
Anti-thrombotic activity (ED$_{50}$):
Weight loss = 0.15 mg/kg
Incidence % = 0.53 mg/kg
Bleeding time:
70% at 0.5 mg/kg
100% at 1 mg/kg

EXAMPLE 5

Semi-Synthetic Glycosaminoglycan with Heparin or Heparan Structure of General Formula IV in which —Z(R$_2$)R$_1$ corresponds to (S)-2-Aminophenylthio The reaction is carried out under the same conditions as described in Example 1 using 6300 mg of 2-aminothiophenol instead of 3760 mg of glycine and extending the reaction time to 72 hours. At the end of the reaction, after having neutralized the pH through the addition of hydrochloric acid, the excess of aminothiophenol is eliminated by extracting it with chloroform. The aqueous solution is then subjected to dialysis and lyophilization, as described in Example 1, obtaining 690 mg of product of the title with the following analytical and pharmacological characteristics:

Free amino groups = 4.7%
$^{13}$C-NMR (p.p.m.): 151.0; 139.2; 133.9; 122.8; 120.6; 119,8; 104.8; 103.6; 98.6; 79.2; 75.8; 72.8; 71.9; 69.3; 62.8; 60.6; 54.2; 52.6.
$[a]_{546}^{20} = +53°$
$[a]_{589}^{20} = +42°$
APTT (2T) = 8.3 mcg/ml
Anti-thrombotic activity (ED$_{50}$):
Weight loss = 1.12 mg/kg
Incidence % = 1.72 mg/kg

EXAMPLE 6

Semi-Synthetic Glycosaminoglycan with Heparin or Heparan Structure of General Formula IV in which —Z(R$_2$)R$_1$ Corresponds to 1,3-Propandithio-1-yl The reaction is carried out under the same conditions as described in Example 1 in a nitrogen atmosphere using 5390 mg of 1,3-propandithiol instead of 3760 mg of glycine and extending the reaction time to 90 hours.

630 Mg of product of the title are obtained with the following, analytical characteristics:

Free amino groups = 2.6%
S = 6.1%
$^{13}$C-NMR (p.p.m.): 178.4; 104.9; 99.3; 80.2; 79.2; 77.9; 75.7; 73.0; 71.8; 69.2; 62.9; 60.8; 49.4; 40.1; 35.1; 34.2; 25.3.
$[a]_{546}^{20} = +55°$
$[a]_{589}^{20} = +47°$

EXAMPLE 7

Semi-Synthetic Glycosaminoglycan with Heparin or Heparan Structure of General Formula IV in which —Z(R$_2$)R$_1$ Corresponds to (N)-2-Aminoethyldisulfate The reaction is carried out under the same conditions as described in Example I using 7050 mg of 2-aminoethylhydrogen sulfate instead of 3760 mg of glycine and submitting the reaction mixture to filtration before subjecting it to dialysis.

510 Mg of product of the title are obtained with the following analytical and pharmacological characteristics:

Free amino groups = 1.1%
S = 6.2%
$^{13}$C-NMR (p.p.m.): 178.9; 104.8; 102.8; 98.8; 80.5; 79.2; 77.1; 71.8; 70.4; 69.2; 62.4; 60.9; 49.6.
$[a]_{546}^{20} = +52°$
$[a]_{589}^{20} = +43°$
APTT (2T) = 6.1 mcg/ml
Anti-thrombotic activity (ED$_{50}$):
Weight loss = 0.66 mg/kg
Incidence % = 1.77 mg/kg

EXAMPLE 8

Semi-Synthetic Glycosaminoglycan with Heparin or Heparan Structure of General Formula IV in which —Z(R$_2$)R$_1$ Corresponds to Taurinyl The reaction is carried out under the same conditions as described in Example 1 using 6260 mg of taurine instead of 3760 mg of glycine and extending the reaction time to 72 hours.

560 Mg of product of the title are obtained with the following analytical and pharmacological characteristics:

Free amino groups = 1.2%
S = 7.19%
$^{13}$C-NMR (p.p.m.): 178.7; 104.9; 102.3; 99.0; 80.8; 79.3; 77.4; 71.8; 69.3; 62.9; 60.8; 52.4; 46.4.
$[a]_{546}^{20} = +62°$
$[a]_{589}^{20} = +50°$
APTT (2T) = 12 mcg/ml
Anti-thrombotic activity (ED$_{50}$):
Weight loss = 0.52 mg/kg
Incidence % = 1.31 mg/kg

EXAMPLE 9

Semi-Synthetic Glycosaminoglycan with Heparin or Heparan Structure of General Formula IV in which —Z(R$_2$)R$_1$ Corresponds to (S)-Carboxymethylthio The reaction is carried out in a nitrogen atmosphere in the same conditions as described in Example 1 using 7416 mg of thioglycolic acid and 6450 mg of sodium hydroxide in 20 ml of water and extending the reaction time to 72 hours. 450 Mg of product of the title are obtained with the following analytical and pharmacological characteristics:

Free amino groups=1.2%
$^{13}$C-NMR (p.p.m.): 180.8; 178.1; 104.1; 99.2; 79.0; 72.7; 71.8; 69.2; 62.5; 60.6; 50.5; 40.1.
$[a]_{546}^{20}=+59°$
$[a]_{589}^{20}=+50°$
Anti-thrombotic activity (ED$_{50}$):
Weight loss=0.40 mg/kg
Incidence %=1.22 mg/kg

EXAMPLE 10

Semi-Synthetic Glycosaminoglycan with Heparin or Heparan Structure of General Formula IV in which —Z(R$_2$)R$_1$ Corresponds to (S)-2-Aminoethylthio The reaction is carried out in a nitrogen atmosphere in the same conditions as described in Example 1 using 5700 mg of cysteamine hydrochloride instead of 3760 mg of glycine and extending the reaction time to 72 hours.

490 Mg of product of the title are obtained with the following analytical characteristics:
Free amino groups=34%
$^{13}$C-NMR (p.p.m.): 178.1; 104.6; 98.4; 79.1; 77.7; 72.7; 71.8; 69.1; 62.8; 60.5; 50.4; 41.5; 40.6; 36.0; 33.0.
$[a]_{546}^{20}=+54°$
$[a]_{589}^{20}=+46°$

EXAMPLE 11

Semi-Synthetic Glycosaminoglycan with Heparin or Heparan Structure of General Formula IV in which —Z(R$_2$)R$_1$ Corresponds to β-Alanine Ethyl Ester The reaction is carried out in the same conditions as described in Example 1 using 7680 mg of β-alanine ethyl ester hydrochloride instead of 3760 mg of glycine and extending the reaction time to 72 hours.

480 Mg of product of the title are obtained with the following analytical characteristics:
Free amino groups=8.1%
$^{13}$C-NMR (p.p.m.):178.1; 104.8; 102.1; 100.5; 98.6; 97.3; 79.5; 75.5; 72.2; 71.6; 68.8; 65.2; 64.6; 62.4; 60.5; 39.2; 38.2; 36.1; 34.6; 15.9.
$[a]_{546}^{20}=+60°$
$[a]_{589}^{20}=+49°$

EXAMPLE 12

Semi-Synthetic Glycosaminoglycan with Heparin or Heparan Structure of General Formula IV in which —Z(R$_2$)R$_1$ Corresponds to Azido 500 Mg of semi-synthetic glycosaminoglycan with 2,3-epoxygulonic structure as described in Example 3 of published European patent application EP 0347588 and 6500 mg of sodium azide in 20 ml of water are solubilized in a nitrogen atmosphere. The reaction mixture is kept under stirring at room temperature for 96 hours and then the solution is subjected to dialysis for 12 hours in running water and for 6 hours in distilled water, after having neutralized it with an aqueous solution of hydrochloric acid. The resulting solution is lyophilized obtaining 410 mg of product of the title with the following analytical and pharmacological characteristics:
Free amino groups=1.8%
$^{13}$C-NMR (p.p.m.): 178.1; 102.9; 98.1; 80.2; 79.1; 76.4; 72.8; 71.8; 69.8; 68.9; 63.8; 62.6; 60.5.
$[a]_{546}^{20}=+72°$
$[a]_{589}^{20}=+60°$
Anti-thrombotic activity (ED$_{50}$):
Weight loss=0.20 mg/kg
Incidence %=0.64 mg/kg

EXAMPLE 13

Semi-Synthetic Glycosaminoglycan with Heparin or Heparan Structure of General Formula IV in which —Z(R$_2$)R$_1$ Corresponds to (N)-Hydroxylamino The reaction is performed in the same conditions as described in Example 1 using 3470 mg of hydroxylamine hydrochloride instead of 3760 mg of glycine. At the end of the reaction, the solution pH results neutral and in this way the adding of aqueous hydrochloric acid to neutralize the solution is unnecessary. 500 Mg of product of the title are obtained with the following analytical and pharmacological characteristics:
Free amino groups=1.7%
$^{13}$C-NMR (p.p.m.): 178.6; 178.1; 104.8; 101.5; 98.0; 80.1; 79.2; 76.2; 72,2; 71.7; 69.1; 67.1; 65.7; 62.6; 60.7.
$[a]_{546}^{20}=+66°$
$[a]_{589}^{20}=+57°$
APTT (2T)=19.3 mcg/ml
Bleeding time:
40.8% at 0.5 mg/kg
74.2% at 1 mg/kg
135.8% at 2 mg/kg
Anti-thrombotic activity (ED$_{50}$):
Weight loss=0.74 mg/kg
Incidence %=1.44 mg/kg

EXAMPLE 14

Semi-Synthetic Glycosaminoglycan with Heparin or Heparan Structure of General Formula IV in which —Z(R$_2$)R1 Corresponds to L-Cystinyl 4000 Mg of sodium hydroxide and 12010 mg of L-cystine are dissolved in 70 ml of water and a solution containing 500 mg of semi-synthetic glycosaminoglycan with 2,3-epoxygulonic structure as described in Example 3 of published European patent application EP 0347588 in 2,5 ml of water is added. The reaction mixture is kept under stirring for 48 hours at room temperature and then is neutralized by adding of aqueous hydrochloric acid. The solid residue, that is formed, is then filtered off and the clear solution is subjected to dialysis for 12 hours with running water and for 6 hours with distilled water and finally is lyophilized.

730 Mg of product of the title are obtained with the following analytical and pharmacological characteristics:
Free amino groups=10,5%
$^{13}$C-NMR (p.p.m.): 178.1; 104.8; 102.1; 98.7; 97.4; 79.7; 75.7; 72.0; 69.0; 62.6; 60.5; 56.3; 41.3.
$[a]_{546}^{20}=+42°$
$[a]_{589}^{20}=+32°$
APTT (2T)=18.4 mcg/ml

EXAMPLE 15

Semi-Synthetic Glycosaminoglycan with Heparin or Heparan Structure of General Formula IV in which —Z(R$_2$)R$_1$ Corresponds to Glycyl The reaction is in the same conditions as described in Example 1 using 500 mg of semi-synthetic glycosaminoglycan with 2,3-epoxygulonic structure as described in Example 5 of EP 0347588.

510 Mg of product of the title are obtained with the following analytical characteristics:
Free amino groups=1.2%
$^{13}$C-NMR (p.p.m.): 178.3; 104.8; 102.1; 98.6; 80.1; 79.1; 77.3; 71.7; 69.0; 62.6; 60.7; 53.6.
$[a]_{546}^{20}=+42°$
$[a]_{589}^{20}=+36°$

EXAMPLE 16

Semi-Synthetic Glycosaminoglycan with Heparan Structure of General Formula IV in which —Z(R$_2$)R$_1$ Corresponds to Glycyl Carrying out the reaction accordingly to the method described in Example 3 of EP 0347588 on a commercial heparan (OPOCRIN) obtained from bovine spleen, the semi-synthetic glycosaminoglycan with 2,3-epoxygulonic structure of general formula III has been prepared with the following analytical characteristics:

Free amino groups=2.5%

$^{13}$C-NMR (p.p.m.): 178.0; 177.4; 105.1; 99.6; 98.1; 97.1; 81.0; 78.8; 76.2; 73.3; 71.8; 70.9; 62.1; 60.3; 56.6; 55.9; 54.1; 53.1; 24.5.

$[\alpha]_{546}^{20} = +102°$ $[\alpha]_{589}^{20} = +87°$

500 Mg of this semi-synthetic glycosaminoglycan with 2,3-epoxygulonic structure of general formula III are subjected to reaction with glycine in the same conditions as described in Example 1.

480 Mg of product of the title are obtained with the following analytical characteristics:

Free amino groups=3.0%

$^{13}$C-NMR (p.p.m.): 178.0; 177.5; 105.2; 102.0; 99.6; 98.7; 81.1; 80,3; 79.1; 76.3; 73.4; 71.9; 69.2; 62.5; 60.5; 56.0; 53.6; 24.5.

$[\alpha]_{546}^{20} = +80°$ $[\alpha]_{589}^{20} = +68°$

We claim:

1. A glycosaminoglycan of molecular weight 3,000-50,000, said glycosaminoglycan being derived from heparin or heparan sulfate and exhibiting antithrombotic and thrombolytic activity essentially equivalent to heparin with lower risk of hemorrhage, said glycosaminoglycan having the formula

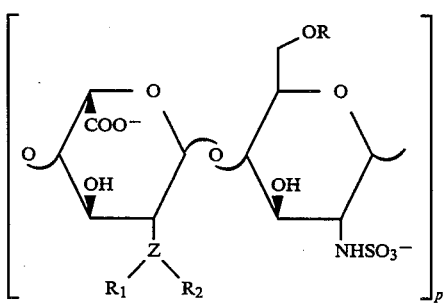

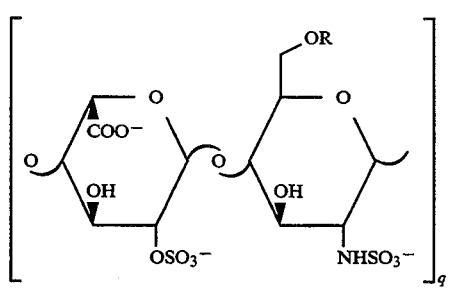

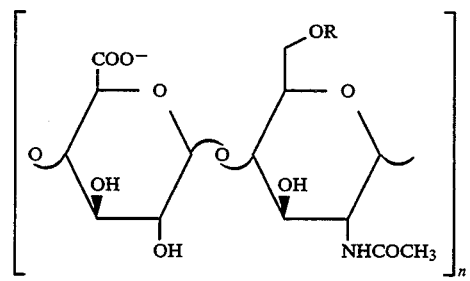

wherein p+q=m, with p other than 0, and m and n are whole numbers between 1 and 100, R is hydrogen or the sulfate residue —SO$_3$— and —Z(R$_2$)R$_1$ is a nucleophilic group, wherein Z is sulphur or nitrogen, R$_1$ is a member selected from the group consisting of substituted or unsubstituted straight C$_1$–C$_{12}$ alkyl, branched C$_3$–C$_{12}$ alkyl, amino, aryl, and hydroxy groups, and R$_2$ is a member selected from the group consisting of hydrogen, straight C$_1$–C$_6$ alkyl, branched C$_3$–C$_6$ alkyl, and when Z is sulfur, R$_2$ is absent, or when Z is nitrogen, R$_1$ and R$_2$ together with Z form a heterocyclic ring or R$_1$ is diazo and R$_2$ is absent.

2. The glycosaminoglycan according to claim 1, wherein R$_1$ is unsubstituted or is substituted by a substituent which is a member selected from the group consisting of unsubstituted or substituted amino, aryl, carboxy, sulfonic and mercapto groups.

3. The glycosaminoglycan according to claim 2 wherein Z is nitrogen, R$_1$ is an alkylene group of 1-4 carbon atoms substituted by —COOH, —CO—NH—CH$_2$—COOH, —SO$_3$H, —OSO$_3$H, —COO—Et or R$_1$ is

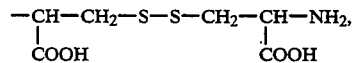

or —OH, or R$_1$ is diazo and R$_2$ is absent; or wherein Z is S, R$_1$ is an alkylene group of 1-4 carbon atoms substituted by —COOH, —SH, or —NH$_2$, or R$_1$ is

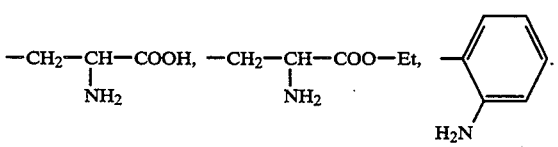

4. The glycosaminoglycan according to claim 3 of the formula

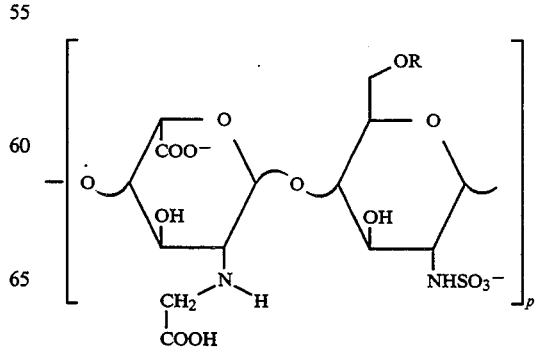

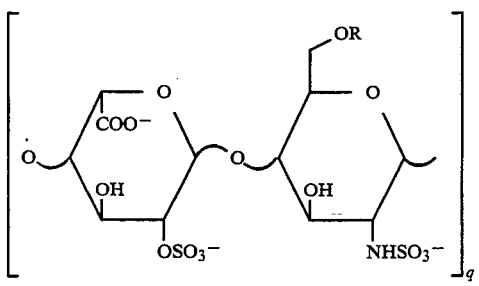
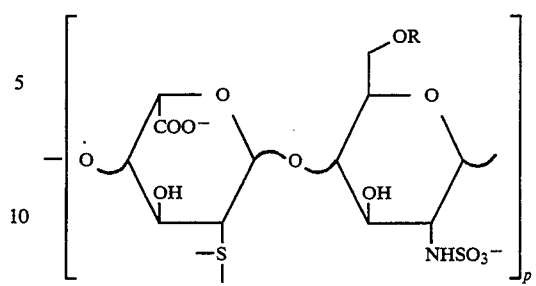
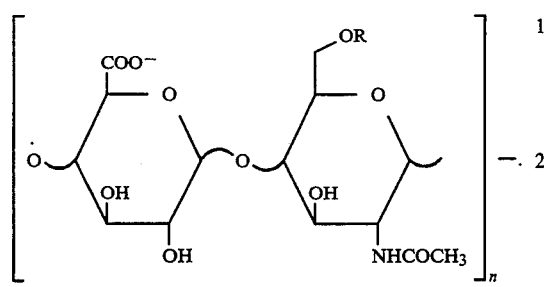
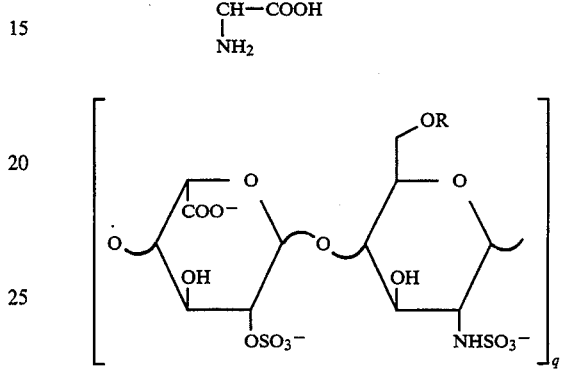
5. The glycosaminoglycan according to claim 3 of the formula
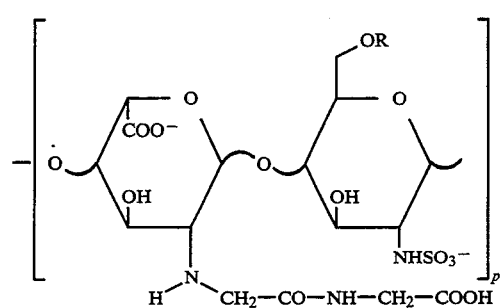
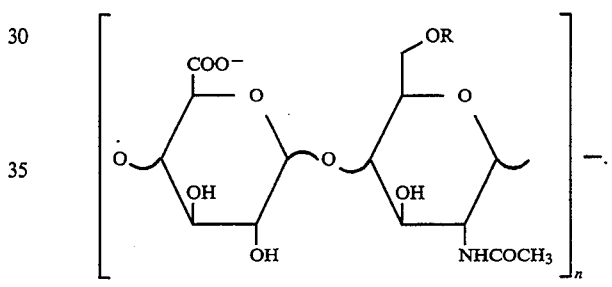
7. The glycosaminoglycan according to claim 3 of the formula
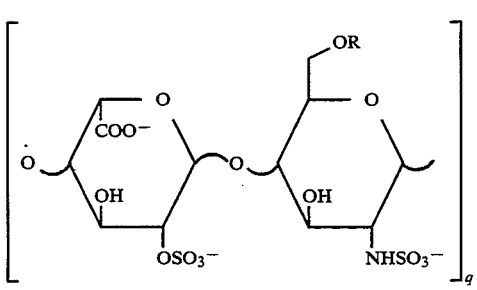
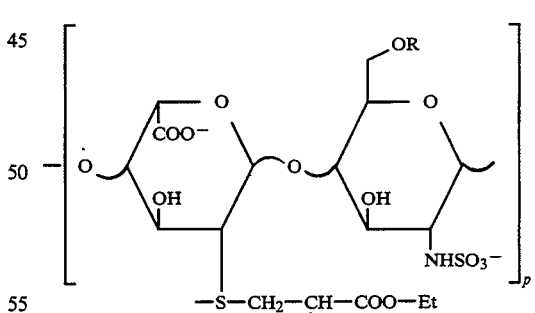
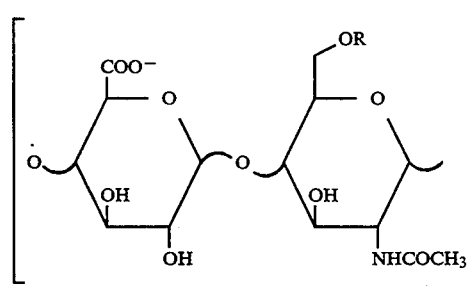
6. The glycosaminoglycan according to claim 3 of the formula
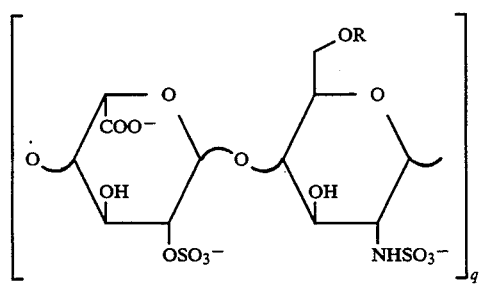

-continued
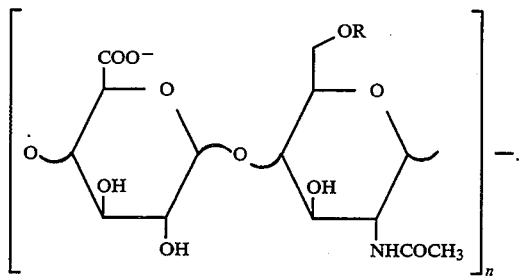
8. The glycosaminoglycan according to claim 3 of the formula
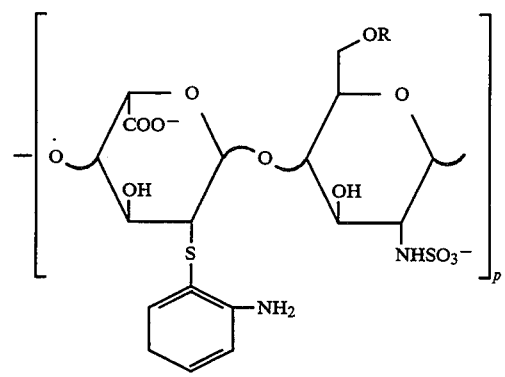
9. The glycosaminoglycan according to claim 3 of the formula
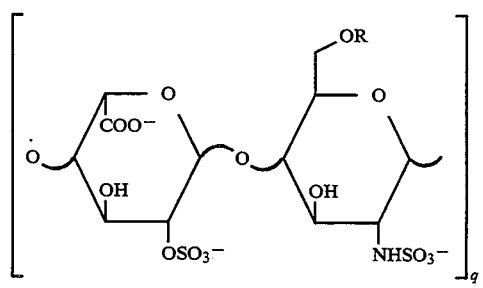
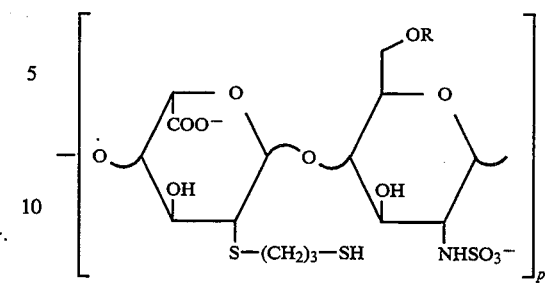
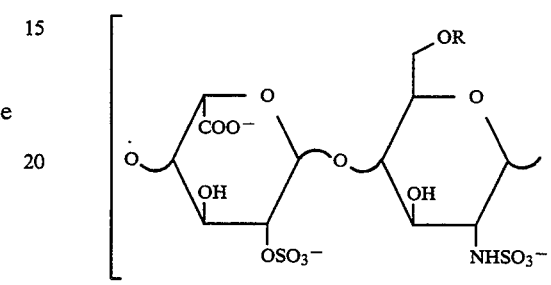
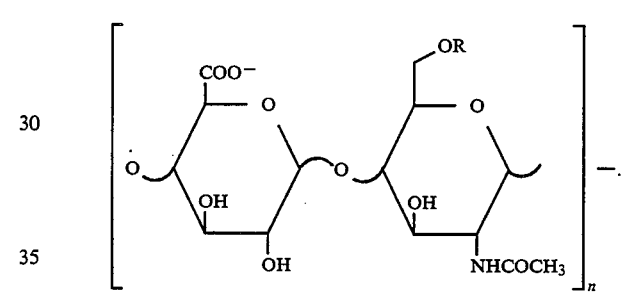
10. The glycosaminoglycan according to claim 3 of the formula
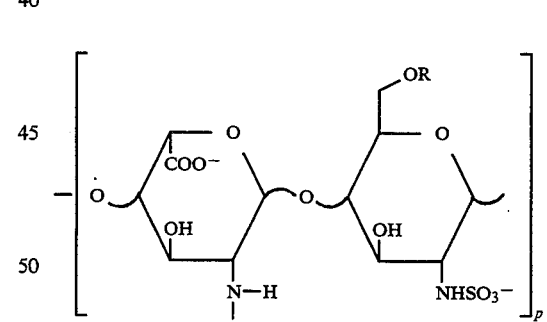
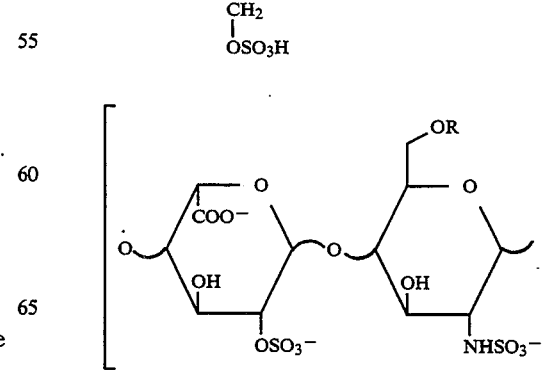

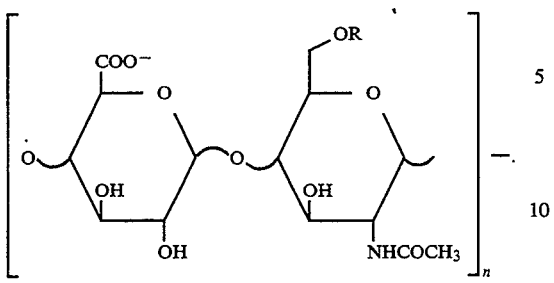
11. The glycosaminoglycan according to claim 3 of the formula
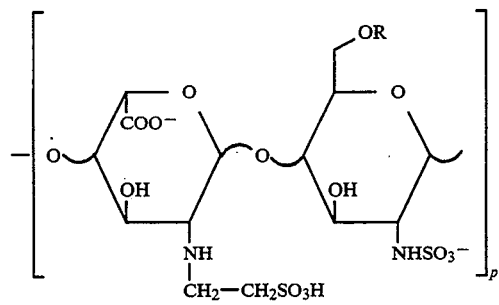
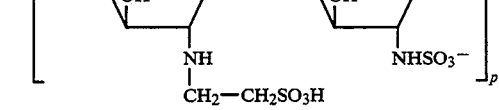
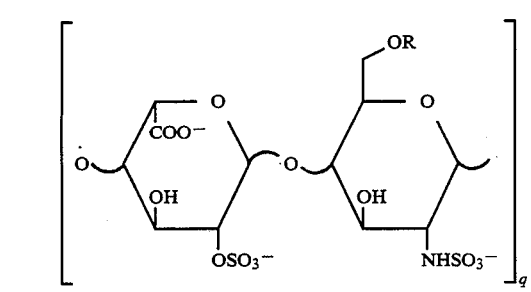
12. The glycosaminglycan according to claim 3 of the formula
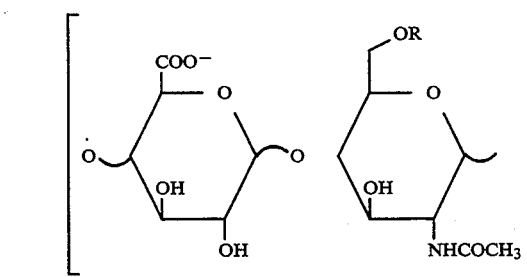
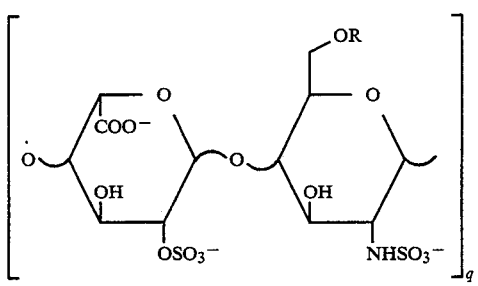
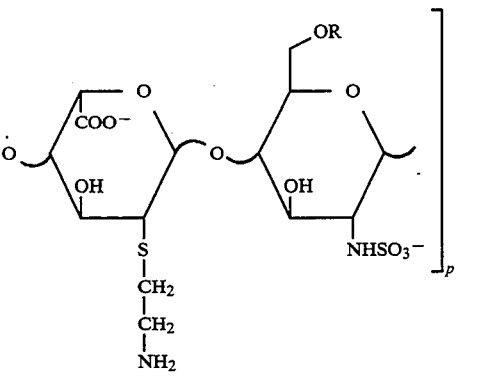
13. The glycosaminoglycan according to claim 3 of the formula
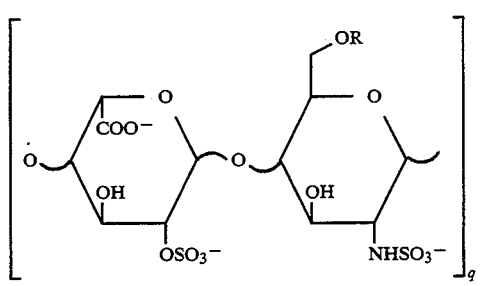
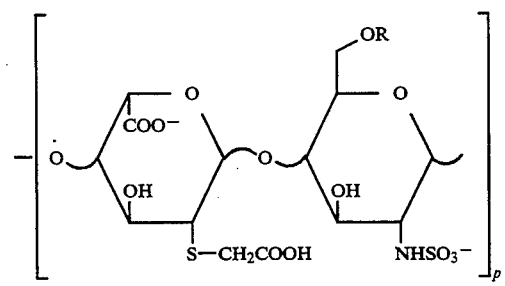
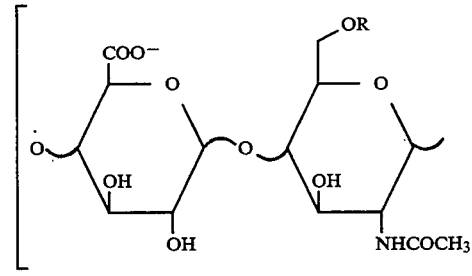

14. The glycosaminoglycan according to claim 3 of the formula
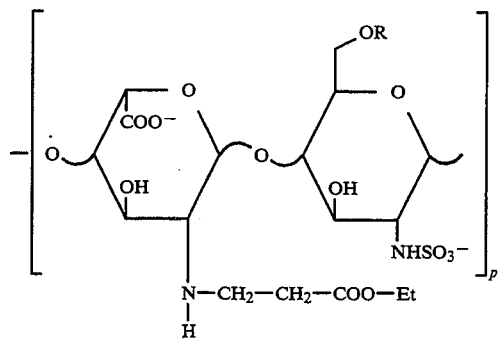
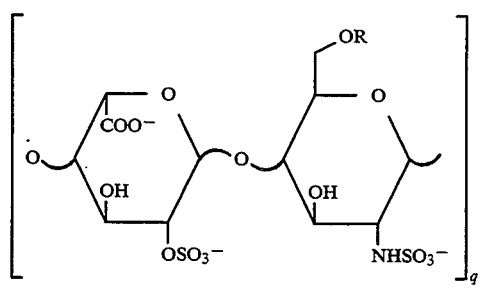
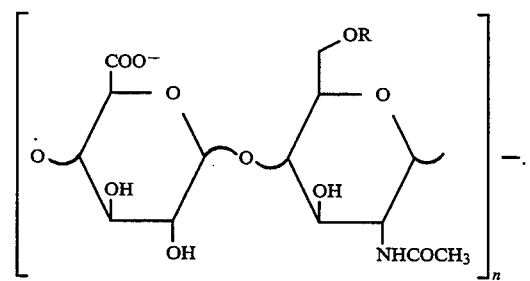
15. The glycosaminoglycan according to claim 3 of the formula
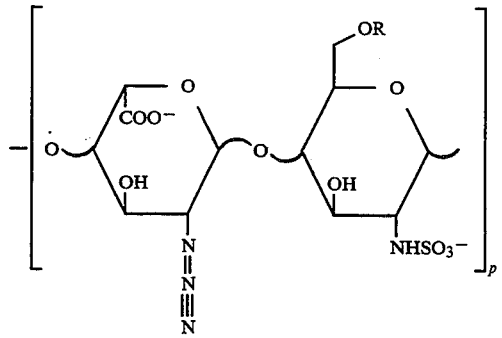
-continued
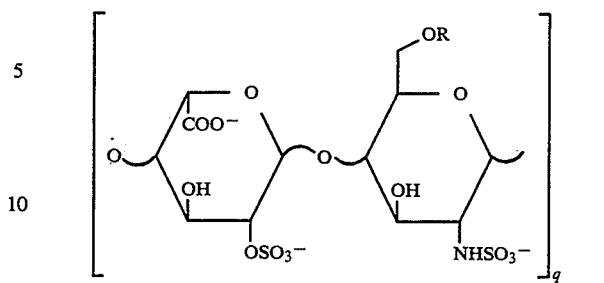
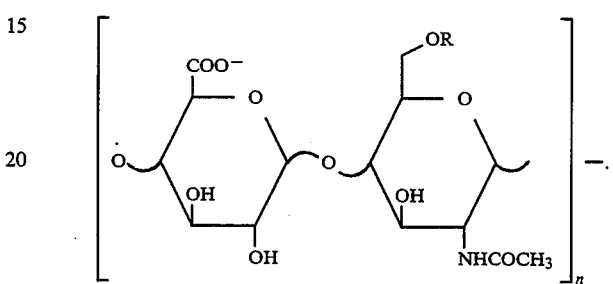
16. The glycosaminoglycan according to claim 3 of the formula
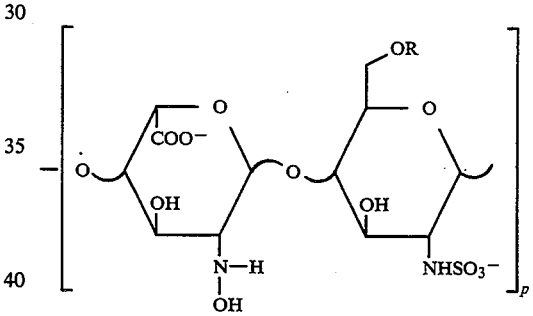
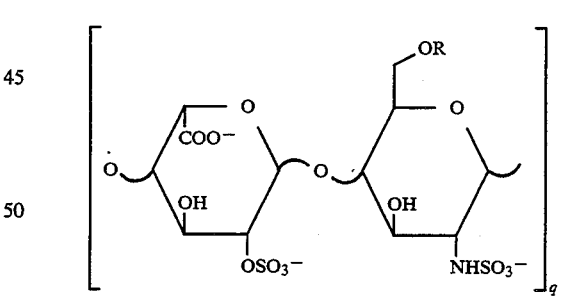
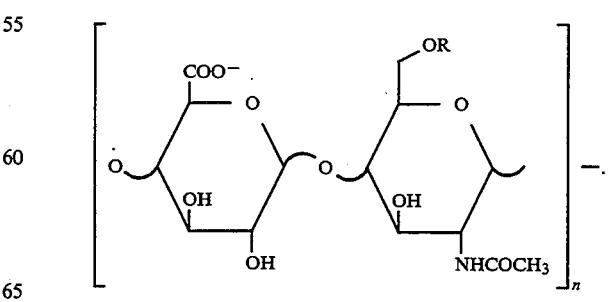
17. The glycosaminoglycan according to claim 3 of the formula

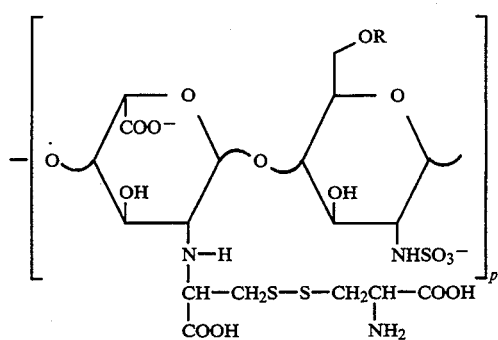

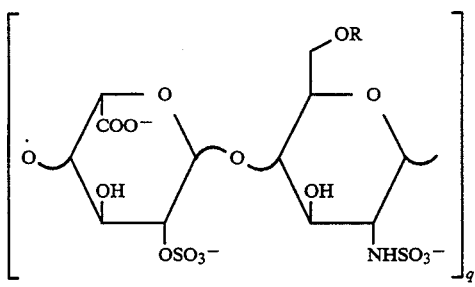

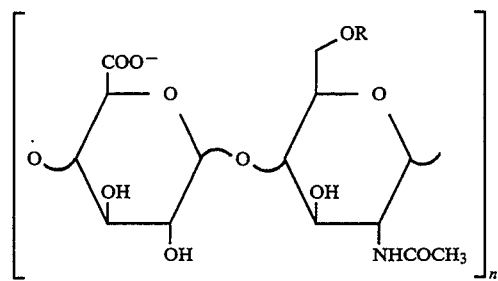

18. A process for the synthesis of a product glycosaminoglycan of the formula

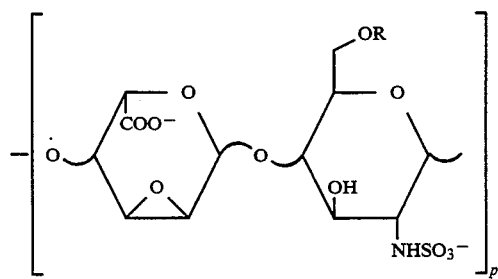

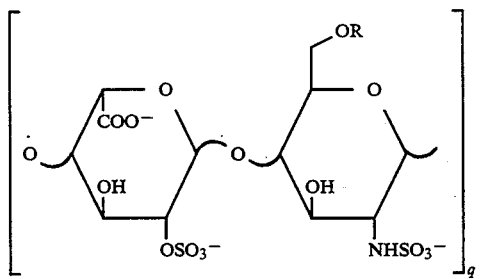

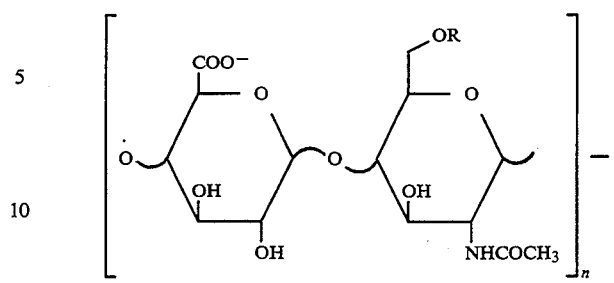

wherein p+q=m, with p other than 0, and m and n are whole numbers between 1 and 100, R is hydrogen or the sulfate residue $—SO_3—$ and $—Z(R_2)R_1$ is a nucleophilic group, wherein Z is sulphur or nitrogen and when Z is nitrogen, $R_1$ is a member selected from the group consisting of substituted or unsubstituted straight $C_1$-$C_{12}$ alkyl, branched $C_3$-$C_{12}$ alkyl, amino, aryl, and hydroxy groups, and $R_2$ is a member selected from the group, consisting of hydrogen, straight $C_1$-$C_6$ alkyl, branched $C_3$-$C_6$ alkyl, or $R_1$ is diazo and $R_2$ is absent and when Z is sulfur, $R_2$ is absent, or $R_1$ and $R_2$ together with Z form a heterocyclic ring, which consists of reacting a glycosaminoglycan with a 2,3-epoxygulonic structure of the formula

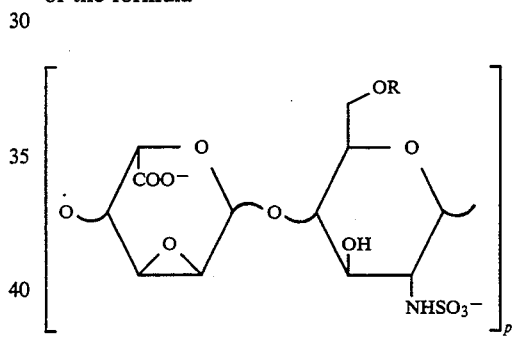

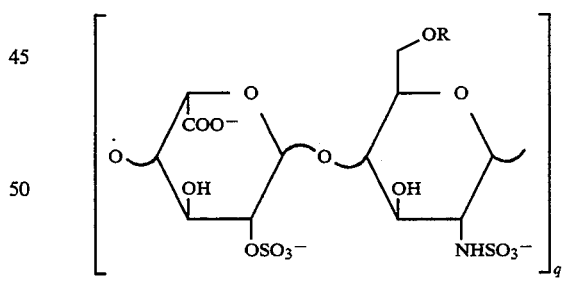

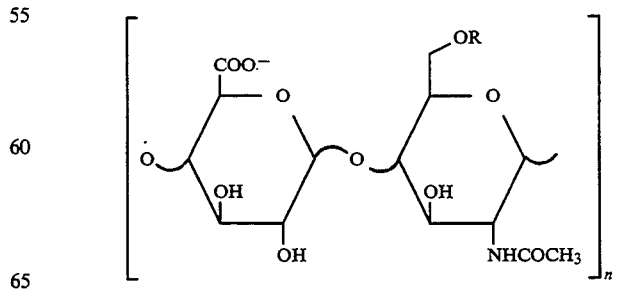

which contains the dimer unit with epoxy groups with
a) a nucleophilic reagent containing said group

b) or a salt of said nucleophilic reagent and when said $R_1$ is substituted by an acidic group or when the reaction is carried out with a salt of said nucleophilic reagent in the presence of a quantity of a base sufficient to salify said acidic group or to release said nucleophilic reagent from the salt thereof, in the presence of a solvent which is water or a polar solvent or a mixture of water and said polar solvent, under stirring for a period of time between 24 and 96 hours at a temperature between 10° and 30° C., diluting the reaction mixture with water when the said solvent is other than water whereby an aqueous solution is obtained, adjusting the pH of said aqueous solution to neutrality by addition of an aqueous solution of hydrochloric acid, subjecting said aqueous solution to dialysis, first with tap water and then with distilled water and isolating said product glycosaminoglycan by lyophilization of said aqueous solution, said product glycosaminoglycan being free of depolymerization with respect to said glycosaminoglycan with a 2,3-epoxygulonic structure.

19. The process according to claim 18 wherein said nucleophilic reagent is a member selected from the group consisting of primary amines, secondary amines, secondary heterocyclic amines, aminoalcohols, aminothiols, aminoacids, aminoesters, peptides, mercaptans, dithiols, thiophenols, hydroxylamines, hydrazines, hydrazides and sodium azide.

20. The process according to claim 18 wherein said nucleophilic reagent is a member selected from the group consisting of glycine, glycylglycine, L-cysteine, acetyl-L-cysteine, L-cysteine ethyl ester, 2-aminothiophenol, 1,3-propanedithiol, cysteamine, sodium azide, 2-aminoethyl hydrogen sulfate, taurine, thioglycolic acid, B-alanine ethyl ester, L-cystine, hydroxylamine, glycyltaurine, cysteinyltaurine, glycylcysteine, glycylphenylalanine, glycyltyrosine, 2-amino-ethanol, glycine 2-aminoethyl ester, glycine 2-hydroxyethyl amide, arginyllysine, arginine, lysine, acetic acid 2-aminoethyl ester, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

21. The process according to claim 18 wherein said polar solvent is a member selected from the group consisting of dimethylacetamide, dimethylformamide, acetonitrile, dioxane and tetrahydrofuran.

22. The process according to claim 18 wherein said base is an inorganic or organic base.

23. The process according to claim 18 wherein said nucleophilic agent is reacted in an amount between 1 and 200 molar equivalents with respect to said dimer unit of said glycosaminoglycan containing the epoxy groups.

24. The process according to claim 18 wherein an excess of said nucleophilic reagent or of said salt thereof is reacted and after the reaction, said excess is removed by extraction with a solvent immiscible with water or by filtration.

25. The process according to claim 18 wherein the base used is selected from sodium hydroxide, potassium hydroxide or triethylamine.

26. The process according to claim 18 wherein said reaction of said glycosaminoglycan with a 2,3-epoxygulonic structure with said nucleophilic reagent or said nucleophilic acid salt is carried out in an atmosphere of inert gas.

27. The process according to claim 18 wherein said glycosaminoglycan with a 2,3-epoxygulonic structure is dissolved in water to form a first aqueous solution; said first aqueous solution is added to a second aqueous solution containing 10–100 molar equivalents of said nucleophilic reagent, nucleophilic reagent wherein $R^1$ is substituted by one of said acidic groups, or nucleophilic reagent salt; a quantity of sodium hydroxide sufficient to salify said acidic group or to release said nucleophilic reagent from said nucleophilic reagent salt is added, keeping the reaction mixture at room temperature for a period of time between 24 and 96 hours; the reaction mixture is neutralized with aqueous hydrochloric acid if the pH of the reaction mixture is not neutral; the aqueous solution is subjected to dialysis first with tap water and then with distilled water for a period of time between 6 and 24 hours; and the product is isolated from the solution by lyophilization.

* * * * *

UNITED STATES PATENT AND TRADEMARK OFFICE
CERTIFICATE OF CORRECTION

PATENT NO. : 5,430,133
DATED : July 4, 1995
INVENTOR(S) : Silvano Piani, et al

It is certified that error appears in the above-identified patent and that said Letters Patent is hereby corrected as shown below:

On the title page, delete --[*] Notice: the portion of the term of this patent subsequent to May 16, 2002 has been disclaimed.--

Signed and Sealed this

Seventh Day of April, 1998

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.   : 5,430,133
DATED        : JULY 4, 1995
INVENTOR(S)  : SILVANO PIANI, ET AL

It is certified that error appears in the above-identified patent and that said Letters Patent is hereby corrected as shown below:

Claim 18, column 25, lines 45-56, amend the formula therein to read:

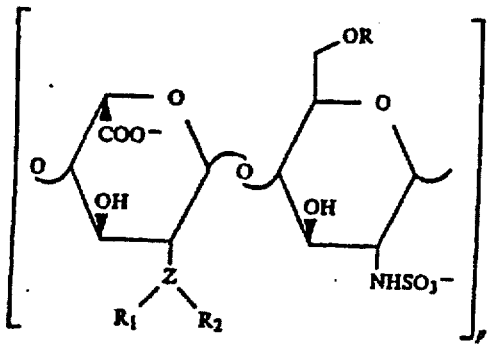

Signed and Sealed this

Thirteenth Day of October 1998

Attest:

BRUCE LEHMAN

Attesting Officer

Commissioner of Patents and Trademarks